Aug. 20, 1963   E. T. BRYAND   3,100,928
HONEYCOMB OPENWORK
Filed Sept. 15, 1960
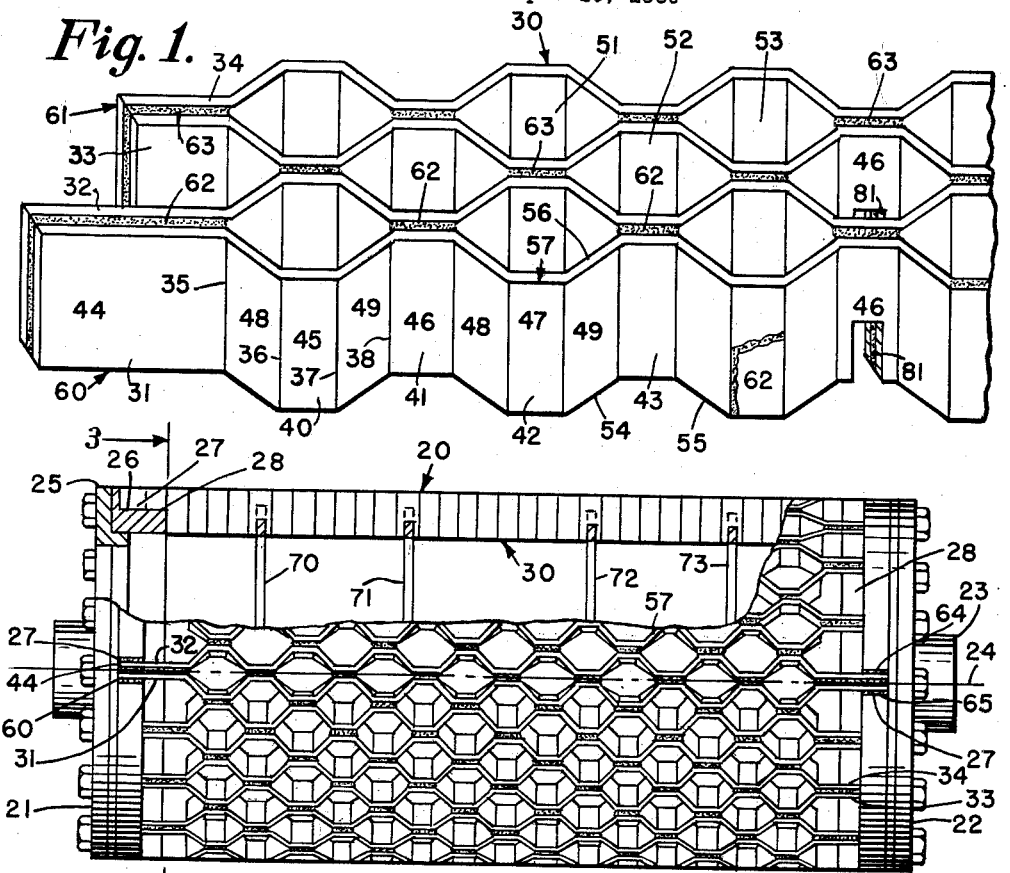
Fig. 1.
Fig. 2.
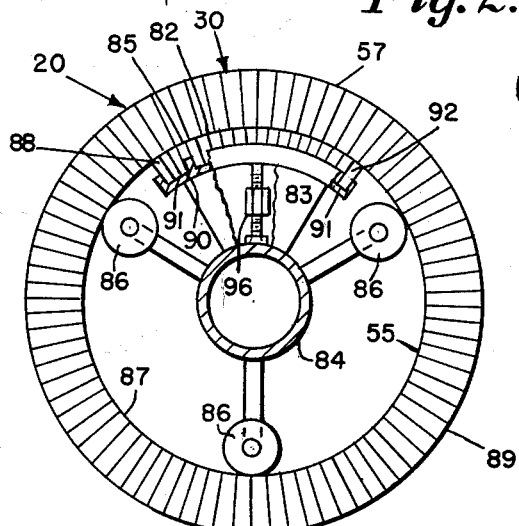
Fig. 3.
Fig. 4.
INVENTOR.
EDWARD T. BRYAND
BY
Pearson + Pearson
ATTORNEYS

United States Patent Office 3,100,928
Patented Aug. 20, 1963

3,100,928
HONEYCOMB OPENWORK
Edward T. Bryand, South Portland, Maine, assignor to Metal-Tech, Inc., South Windham, Maine, a corporation of Maine
Filed Sept. 15, 1960, Ser. No. 56,192
11 Claims. (Cl. 29—121)

This invention relates to an improved honeycomb type open work especially adapted for forming the meshes of a meshed screen or roll such as are much used in the paper making industry.

Suction boxes, suction rolls, dandy rolls, embossing rolls and the like have been formed in many different ways in the past, and usually consist of a frame or skeletonized spider-type support with an apertured plate or a wire mesh screen supported thereby. Edgewise upstanding corrugated elements have been disclosed in U.S. Patent 2,240,869 to Specht of May 6, 1941, and U.S. Patent 2,803,172 to Trotman of August 20, 1957, for serving as the inner hollow cylindrical sieve which supports the outer wire mesh screen covering of a cylindrical, meshed roll. Edgewise upstanding elements, having a band of half hexagonal corrugations have been disclosed in German Patent 396,980 to Lindner of June 12, 1924 for serving as the inner sieve for supporting an outer sieve in a cylindrical roll.

It is the object of this invention to provide a honeycomb type openwork of increased strength, and uniformity of mesh size, capable of use as the foraminous covering of a suction roll without an inner supporting cylindrical sieve or cylindrical framework.

Another object of the invention is to provide a honeycomb type cylindrical roll in which the fluid conduits are of uniform hexagonal cross section and barriers to the flow of fluid therethrough are reduced to a minimum.

A further object of the invention is to provide a hollow cylindrical openwork covering on an elongated roll, the lateral supports being wholly within the hollow cylindrical outline of the covering and the longitudinal support being formed by the bonding of the longitudinal faces of the strips into longitudinal interrupted doubled walls of great strength.

Still another object of the invention is to provide a novel honeycomb network of relatively long, thin wide flexible strips upstanding on edge, each strip being bent full width, alternately into half hexagonal ridges and hollows in the same lateral direction and adhesively united back to back to a similar strip for forming a series of identical, hexagonal, fluid conduits of substantially uniform cross section.

A still further object of the invention is to provide a honeycomb type openwork of such structural rigidity that it can serve as a combined hollow cylindrical roll covering and suction screen, on rolls of considerable length, without interior supporting framework.

Other objects and advantages of the invention will be apparent from the claims, the description of the drawings and from the drawings in which:

FIG. 1 is an isometric front view of a portion of a honeycomb openwork constructed in accordance with the invention.

FIG. 2 is a front elevation, partly in section, of a cylindrical roll constructed in accordance with the invention.

FIG. 3 is an end view showing in section the honeycomb openwork of the invention used as an arcuate suction box seal as well as a hollow cylindrical roll covering cooperating therewith.

FIG. 4 is an end view, on a scale similar to that of FIG. 1, of the honeycomb openwork in arcuate, part cylindrical configuration.

In the drawing 20 represents a cylindrical roll constructed in accordance with the invention and suitable for use as a suction roll, cylinder mould, dandy roll, embossing roll, dryer roll or the like. The roll 20 may be of any desired length normally used in paper making machines, for example, ten to twenty feet long and may be of any desired diameter depending on the diameter of the roll heads.

Roll 20 includes a pair of oppositely disposed, circular, roll end heads 21 and 22, each being suitably journalled as at 23 in a manner well known, or otherwise mounted for the rotation of the roll around its longitudinal axis 24. Each circular head, such as 21 or 22, preferably includes an annular outer flange 25 and an inner slotted ring 26, the ring 26 having spaced longitudinally extending, radial slots 27 in the periphery thereof and a cylindrical seat, or shoulder, 28.

The honeycomb type openwork 30 of the invention, as shown in FIG. 1, is formed by a plurality of elongated, thin, wide strips of flexible material such as 31, 32, 33 and 34. Preferably, for a roll forty inches in outside diameter and ten feet in length, the strips are about .020 inch in thickness, about one and one quarter inches in width and about ten feet in length. For longer rolls, or rolls of greater diameter, the width and thickness may be proportionately greater if desired and for smaller rolls the dimensions may be reduced.

Each strip such as 31 is bent transversely, for the full width thereof, as at 35, 36, 37 and 38, to form alternate, flat faced, ridges 40 and 42 and hollows 41 and 43 of identical half hexagonal configuration, the ridges and hollows being on one side only of the original plane of the strip. A plurality of longitudinally extending flat walls, or faces, 44, 45, 46 and 47 are thus formed in each strip, the walls 44 and 46 being in the same longitudinal plane and the walls 45 and 47 being in a longitudinal plane laterally spaced therefrom. A pair of flat walls 48 and 49 connect the longitudinally extending walls to each other and are in planes oblique to a longitudinal plane.

Each alternate strip such as 32 and 34 is inverted and arranged in back to back position relative to one of the strips 31 or 33, and since the ridges 40 and hollows 41 are identical in each strip, full hexagonal upstanding conduits such as 51, 52 and 53 are formed over the entire openwork. The strips 31, 32, 33 and 34 are upstanding on one edge 54 thereof, whereby the hexagonal conduits 51, 52 and 53 are also upstanding, the edges 54 of the openwork defining the lower, or inner, face 55 and the opposite edges 56 defining the upper, or outer, face 57 of the openwork.

To secure the requisite longitudinal resistance to sag and for mutual support, the strips 31 and 32 of each pair of strips 60, and each pair of strips 60 and 61 are secured to each other for the full length of the openwork. As shown all of the flat, longitudinally extending walls 44, 45, 46 and 47 of all of the strips, are adhesively united over their entire meeting faces by bonding means which is preferably a layer 62 or 63 of epoxy resin. Thus the doubled walls 44 and 46 of the strips 31 and 32 are laminated to form an interrupted, longitudinally extending reinforcement for the full length of the openwork, each doubled wall being supported by a pair of oblique walls such as 48 at each end thereof. In addition, of course, when the openwork 30 is of arcuate or cylindrical configuration as in the roll 20, the arching of the openwork provides great resistance to compression or sag.

When the openwork 30 is flat, as in a flat screen, the hexagonal conduits are of uniform cross section. However, when the openwork 30 is curved, as in roll 20, the bends 35, 36, 37 and 38 are slightly out of parallelism and radial to the longitudinal axis 24 of the roll. Thus the area of the hexagonal conduits 51, 52 and 53 at the outer face 57 is slightly larger than the area thereof at the inner face 55. Conventional suction rolls have drilled holes which are countersunk to create a nozzle effect and the nozzle structure results in a high noise level. There is no such nozzle effect in the honeycomb openwork of this invention whereby the advantage of greatly reduced noise level is secured. The circumferential taper of the hexagonal conduits 51, 52 and 53 is best shown in FIG. 4.

Each pair of strips such as 60 and 61 includes the longitudinally extending walls 44 at each opposite end thereof which are supported on the cylindrical seats 28 of the slotted end rings 26 of the roll end heads 21 and 22. Some of the pairs of strips, for example every tenth pair of strips such as 60, are of increased length and anchored in a slot 27 of the ring 26. The double walls 44 of the strips 31 and 32, united by the adhesive layer 62, have their outer faces adhesively united to the inner faces of a slot 27 by layers 64 and 65 of epoxy resin as shown.

Preferably the slots 27 are spaced apart about five degrees of angular distance entirely around the periphery of the rings 26 of heads 21 and 22 for the best results and economy of manufacture. In a roll of greater than forty inches outside diameter, more than seventy-two slots may be provided in proportion to the increase of diameter.

Preferably mutual support is also provided at longitudinally spaced zones along the roll by means of laterally extending annular bars such as 70, 71, 72 and 73. Each bar, or ring 70 is radially slotted as at 74, 75 and 76 (FIG. 4) in the outer peripheral portion 77 to receive each of the doubled walls such as 46 of each pair of strips 60 and 61 and the inner peripheral portion 78 is continuous and unslotted. It should be noted that the annular, slotted bars such as 70 of the openwork 30 are entirely within the confines of the openwork because of the corresponding slots such as 81 in the inner, or lower portions of the doubled walls such as 46, and the bars, therefore, do not project into the interior of the hollow cylindrical roll 20. The inside rim 79 of each bar 70 is flush with the inner face 55 of the openwork, but the outside rim 80 of the bar is spaced inwardly from the outer face 57 of the openwork in order to permit uniform wear and avoid interference with the flow of fluid through the hexagonal conduits.

As shown in FIG. 3 the honeycomb openwork 30 may be used as a foraminous hollow cylindrical covering for a cylindrical roll 89, and an arcuate frame section 82, of such honeycomb openwork, may also be used as an edge seal for a cooperating suction box 83.

The suction box 83 is stationary and mounted on the suction pipe 84 for exhausting fluid through the suction box opening 85. The cylindrical roll 89 is rotatably supported on pipe 84 by means of a plurality of rollers, such as 86, which engage the inside face 87 of the roll or by bearings of any suitable type. The arcuate frame section 82 outlines a longitudinally extending segment of a roll such as 20 and constitutes an edge seal lining the suction box opening 85 with honeycomb openwork 88 identical with that of the roll 89. The openwork 88 is several inches in width and secured by epoxy resin 90 to the angular frame pieces 91 to create cells 92 rather than passages. It has been found that the honeycomb openwork 30 of the cylindrical roll 89 and the honeycomb cells 92 of the edge seal 82 not only closely fit and seal the interface, but serve the same purpose as a labyrinth to create a pressure drop across the interface due to the air passing by the cells. The structure is also useful as a dryer when the path of air therethrough is reversed to blow the air outwardly rather than to draw the air inwardly.

It will be understood that the hexagonal conduits in the openwork 30 of the roll 89 will be covered on the outer face 57 by paper, or filled with water, and therefore become cells, and the openwork 30 becomes a cellular honeycomb facing at 87. A clearance condition of .017 inch has proven to be optimum to maximum turbulence caused by high velocity air passing across the honeycomb facing and such turbulence tends to seal the suction box most effectively. Clearance and pressure may be adjusted by a suitable threaded device 96 at each end of the suction box for moving the frame section 82 toward and away from the inner face 87 of roll 89.

The strips 31, 32, 33 and 34 may be of stainless steel, or the like. However, when the openwork 30 is to be used as a suction box cover or seal, or is to be engaged by Fourdrinier wires of plastic material, I prefer that the strips 31, 32, 33 and 34 be of synthetic plastic such as polytetrafluoroethylene or "Teflon," combined with other inert materials and commercially available as "Rulon A" or that they be of fluorocarbon resin or the like. When honeycombed, as disclosed herein, no underbase or support is required, the "Teflon" honeycomb being self-supporting. The strips 31, 32, 33 and 34 of each openwork 30 are preferably about twenty thousandths of an inch in thickness but may be in a range of .004 to .030 inch in thickness depending on the length and diameter of the roll.

I claim:

1. An elongated, cylindrical roll for paper making machines, said roll comprising a pair of oppositely disposed, longitudinally spaced, circular heads, each head having a plurality of spaced, longitudinally extending, radial slots in the peripheral portion thereof; a hollow cylindrical honeycomb type, openwork extending longitudinally between said heads, said openwork including a plurality of pairs of longitudinally extending strips of thin, wide, flexible material angularly bent, full width, into alternate flat faced ridges and hollows, the strips of each pair being back to back and forming radially extending conduits of hexagonal outline; the longitudinally extending flat, meeting faces of all of said strips being secured flatwise to each other and certain of said pairs of strips being of greater length than the adjacent strips with the opposite ends thereof adhesively anchored in the radial slots of said roll heads for supporting said covering therein.

2. A roll as specified in claim 1 plus a plurality of longitudinally spaced, annular bars mounted wholly within the confines of said hollow cylindrical openwork for lending support thereto between said heads.

3. A roll as specified in claim 1 wherein the angular, full width bends in said longitudinally extending strips are all in planes passing through the axis of said cylindrical roll whereby said hexagonal conduits are slightly greater in area on the outside than on the inside of said roll.

4. A roll as specified in claim 1 wherein the meeting faces of said strips are secured flatwise to each other by layers of epoxy resin.

5. A foraminous cylindrical roll having a pair of longitudinally slotted roll end heads and a honeycomb type openwork extending longitudinally between said heads, said honeycomb openwork comprising a plurality of pairs of longitudinal, edgewise upstanding metal strips bent laterally to mutually form radial, fluid conduits of hexagonal cross section, the flat longitudinal meeting faces of each of said strips being adhesively united to the adjacent strips to form longitudinal, interrupted, doubled, laminated walls and some of the doubled walls at each opposite end of said openwork being anchored in the adjacent slots of said slotted heads.

6. A combination as specified in claim 5 plus a plurality of longitudinally spaced, laterally extending annular bars wholly within the confines of said honeycomb openwork for supporting the same against longitudinal sag.

7. In combination, a honeycomb type openwork defining a closed figure and spaced support means each including a cylindrical seat supporting said openwork only at each opposite end thereof for rotation around an axis, said openwork comprising a plurality of strips of thin, wide flexible material extending in the direction of said axis, each strip having a plurality of identical, alternate ridges and hollows of half hexagonal configuration spaced therealong, formed by full width bends on one side only of the plane of said strip, each alternate strip of said openwork being inverted and juxtaposed back to back in meeting engagement with an adjacent strip to form alternate, identical, full depth, full hexagonal, radial conduits therewith, each open at each opposite end, all of said bends forming said conduits being in planes passing through said axis and radial thereto and bonding means, affixing the meeting faces of said strips to each other to form a plurality of interrupted, laminated, axially extending, double thick, radial walls, entirely around said openwork for mutually supporting said openwork, with said cylindrical seats against axial sag.

8. A combination as specified in claim 7 wherein said support means is a pair of circular roll heads axially spaced on rotatable shaft means, each said head having an annular outer flange peripherally anchoring an opposite end of said openwork.

9. A combination as specified in claim 7 wherein the meeting faces of the strips of said openwork include an axially spaced series of aligned apertures, said apertures being located between the inner and outer faces of said openwork, for accommodating endless supporting elements extending circumferentially around said axis.

10. A combination as specified in claim 7 wherein said strips are of stainless steel about .020 inch in thickness and about one and one quarter inches in width and said bonding means is a layer of epoxy resin.

11. A combination as specified in claim 7 wherein said strips are of polytetra fluoroethylene, each about twenty thousandths of an inch in thickness.

References Cited in the file of this patent

UNITED STATES PATENTS

| | | |
|---|---|---|
| 1,862,909 | Russell | June 14, 1932 |
| 2,025,445 | Flatboe | Dec. 24, 1935 |
| 2,204,780 | Thaler | June 18, 1940 |
| 2,566,439 | Beachler | Sept. 4, 1951 |
| 2,654,686 | Hansen | Oct. 6, 1953 |
| 2,910,396 | Randall | Oct. 27, 1959 |

FOREIGN PATENTS

| | | |
|---|---|---|
| 793,886 | Great Britain | Apr. 23, 1958 |